(12) United States Patent
Dunn et al.

(10) Patent No.: US 7,779,189 B2
(45) Date of Patent: Aug. 17, 2010

(54) METHOD, SYSTEM, AND COMPUTER PROGRAM PRODUCT FOR PIPELINE ARBITRATION

(75) Inventors: Deanna P. Dunn, Hyde Park, NY (US); Garrett M. Drapala, Poughkeepsie, NY (US); Michael F. Fee, Cold Spring, NY (US); Pak-kin Mak, Poughkeepsie, NY (US); Craig R. Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 12/035,249

(22) Filed: Feb. 21, 2008

(65) Prior Publication Data

US 2009/0216933 A1 Aug. 27, 2009

(51) Int. Cl.
*G06F 13/36* (2006.01)
*G06F 12/00* (2006.01)
*G06F 13/00* (2006.01)
*H03M 13/00* (2006.01)

(52) U.S. Cl. .................. 710/113; 710/240; 710/309; 711/147; 714/754

(58) Field of Classification Search .............. 710/240; 711/147; 714/754
See application file for complete search history.

(56) References Cited

U.S. PATENT DOCUMENTS

| | | | | |
|---|---|---|---|---|
| 4,480,307 A | * | 10/1984 | Budde et al. | 710/100 |
| 5,761,455 A | | 6/1998 | King et al. | |
| 5,862,356 A | | 1/1999 | Normoyle et al. | |
| 5,901,295 A | * | 5/1999 | Yazdy | 710/113 |
| 6,078,983 A | * | 6/2000 | Hanawa et al. | 710/240 |
| 6,467,002 B1 | * | 10/2002 | Yang | 710/116 |
| 6,487,621 B1 | * | 11/2002 | MacLaren | 710/240 |
| 6,516,393 B1 | | 2/2003 | Fee et al. | |
| 6,717,834 B2 | * | 4/2004 | Zagorianakos et al. | 365/63 |
| 6,763,415 B1 | | 7/2004 | Tischler | |
| 6,813,266 B1 | | 11/2004 | Chiang et al. | |
| 6,993,640 B2 | * | 1/2006 | Doing et al. | 712/200 |

(Continued)

OTHER PUBLICATIONS

James Reed et al, A Dual Round-Robin Arbiter for Split-Transaction Buses in System on Chip Implementatyions, CCECE 2004, pp. 835-840.*

(Continued)

*Primary Examiner*—Khanh Dang
*Assistant Examiner*—Christopher A Daley
(74) *Attorney, Agent, or Firm*—Cantor Colburn LLP; John Campbell

(57) ABSTRACT

A method for pipeline arbitration including receiving a first request for a shared chip interface from a first pipeline, determining whether a response bus of the shared chip interface is needed by the first request, and if it is determined that the response bus is not needed by the first request, concluding that the first request needs just an address bus of the shared chip interface, arbitrating the first request with a second request for the shared chip interface received from a second pipeline for access to the address bus, sending the first request to the address bus if the first request wins the arbitration over the second request, and rejecting the first request if the second request wins the arbitration over the first request. A corresponding system and computer program product.

18 Claims, 5 Drawing Sheets

U.S. PATENT DOCUMENTS

| | | | |
|---|---|---|---|
| 7,024,506 B1 * | 4/2006 | Harrington | 710/243 |
| 7,353,310 B2 * | 4/2008 | Roever | 710/243 |
| 7,600,065 B2 * | 10/2009 | Lee | 710/240 |
| 2005/0172060 A1 * | 8/2005 | Rowlands et al. | 710/240 |
| 2007/0011382 A1 | 1/2007 | Roever | |
| 2007/0038796 A1 * | 2/2007 | Subramanian et al. | 710/316 |

OTHER PUBLICATIONS

International Business Machines Corporation (IBM), z/Architecture Principles of Operations, Sixth Edition (Apr. 2007), 1216 (split into 4 parts).

* cited by examiner

METHOD, SYSTEM, AND COMPUTER PROGRAM PRODUCT FOR PIPELINE ARBITRATION

BACKGROUND OF THE INVENTION

This invention relates generally to computer processor operation, and more particularly to providing a method, system, and computer program product for pipeline arbitration.

The continually increasing functionality being added to computer chips results in a reduction in available connections to such chips (e.g., pins) and an increase in the number of components (e.g., other chips) that share a chip interface for requests, such as for data transfers. Not all such components that share a chip interface have the same utilization needs. For example, the amount of the interface capacity utilized and the size of the request transferred across the interface can vary. Furthermore, different types of requests need to be processed correctly and fairly (e.g., with appropriate priority) while minimizing the time delay (or "latency") of request responses (e.g., data transfers) across the interface.

In a typical scenario, requests from two separate source paths ("pipelines" or "pipes") compete ("arbitrate") for the use of an interface that includes a set of interface paths ("buses"), such as a response bus, a data bus, and an address bus. The use of one or more of the interface buses depends on the type of request received. The determination of which request uses the interface first is made at a central arbitration point, for example, located before the pipeline inputs, in the stream of the pipelines, or after the pipeline outputs (e.g., at the interface inputs). The determination may be made (e.g., in addition or alternate to other priority factors, such as the nature of the requests) based on the assumption that every request needs all of the interface buses for the maximum possible request size. However, such approaches result in all requests (i.e., regardless of the type) incurring latency due to the interface arbitration even if the needed interface bus is available (e.g., if it is not needed by the competing request) and also causes the need for additional hardware to hold the request that is delayed by the arbitration. Therefore, a pipeline arbitration approach that minimizes such latency and hardware penalties is desirable.

BRIEF SUMMARY OF THE INVENTION

A method, system, and computer program product for pipeline arbitration. An exemplary method embodiment includes receiving a first request for a shared chip interface from a first pipeline, determining whether a response bus of the shared chip interface is needed by the first request, and if it is determined that the response bus is not needed by the first request, concluding that the first request needs just an address bus of the shared chip interface, arbitrating the first request with a second request for the shared chip interface received from a second pipeline for access to the address bus, sending the first request to the address bus if the first request wins the arbitration over the second request, and rejecting the first request if the second request wins the arbitration over the first request.

An exemplary system embodiment includes a first pipeline logic in communication with a first arbitration logic, a second pipeline logic in communication with a second arbitration logic and also in communication with the first pipeline logic in a cross pipeline configuration, a logic-OR gate circuitry in communication with the first arbitration logic and the second arbitration logic, and a shared chip interface in communication with the logic-OR gate circuitry and including a response bus, a data bus, and an address bus, wherein the first pipeline logic is configured to send a first request and the second pipeline logic is configured to send a second request, and wherein the first request and the second request each include one of a request to access just the address bus, a request to access just the response bus, a request to access the response bus and the data bus, or a request to access the response bus, the data bus, and the address bus.

An exemplary computer program product embodiment includes a computer usable medium having a computer readable program, wherein the computer readable program, when executed on a computer, causes the computer to receive a first request for a shared chip interface from a first pipeline, determine whether a response bus of the shared chip interface is needed by the first request, and if it is determined that the response bus is not needed by the first request, conclude that the first request needs just an address bus of the shared chip interface, arbitrate the first request with a second request for the shared chip interface received from a second pipeline for access to the address bus, send the first request to the address bus if the first request wins the arbitration over the second request, and reject the first request if the second request wins the arbitration over the first request.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments of the invention described herein provide a method, system, and computer program product for pipeline arbitration. In accordance with such exemplary embodiments, a pipeline arbitration approach is provided that minimizes the latency and hardware penalties of typical approaches while maintaining fairness and maximizing bandwidth across multiple instances of the same interface. Such exemplary embodiments also allow for multiple request types to use the same interface on a given cycle, resulting in better utilization of critical shared interface ports within a design. Furthermore, such exemplary embodiments allow for more efficient packet routing within a system, since requests requiring multiple ports can be completed within a given request arbitration cycle instead of multiple arbitration requests, which effectively reduces overall request latency while allowing for more complex packet routing algorithms to be implemented with little or no increase in priority latency penalty.

Figure 1:
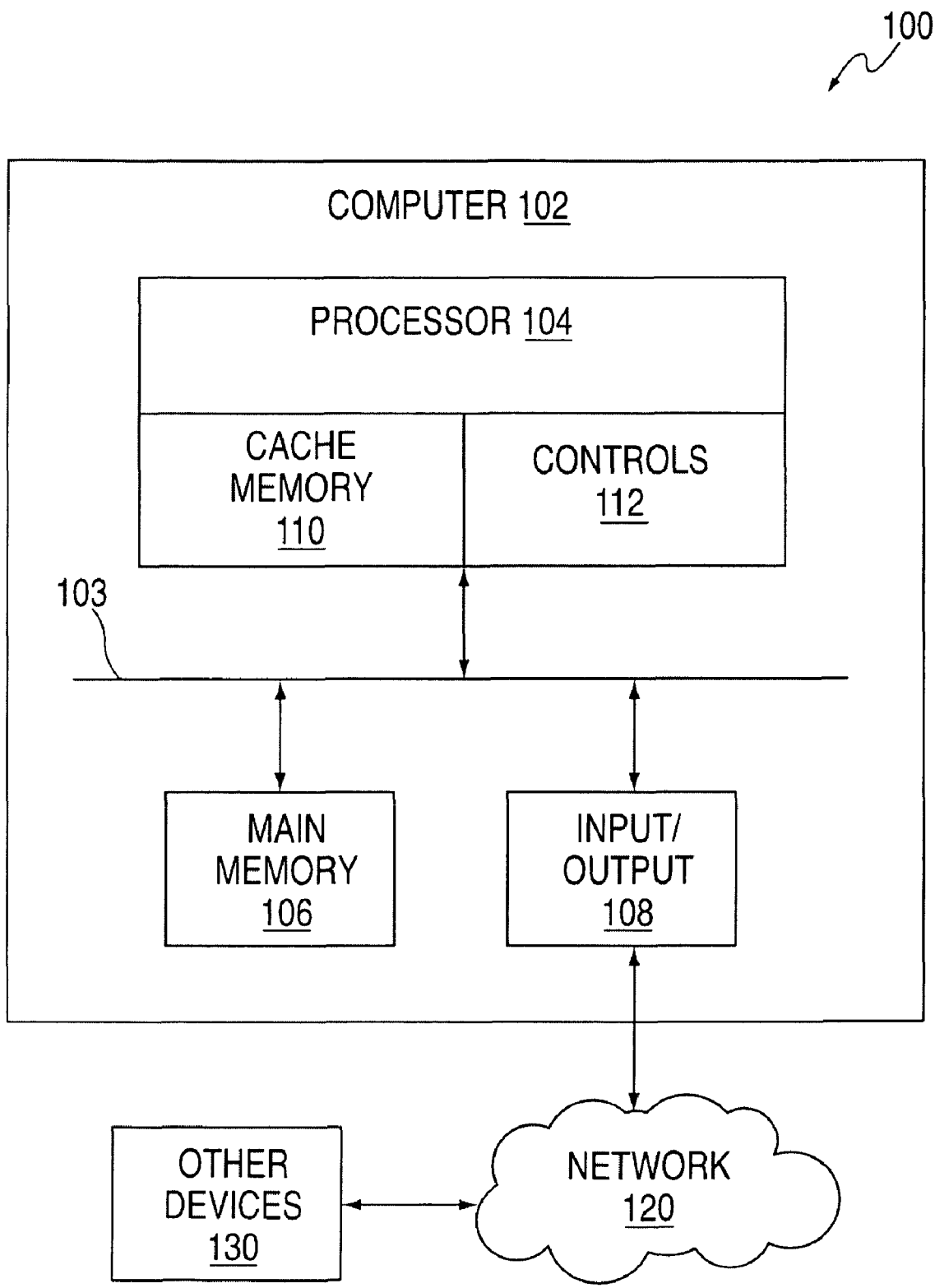
FIG. 1 is a block diagram illustrating an example of a computer system including an exemplary computing device configured for pipeline arbitration.

Turning now to the drawings in greater detail, wherein like reference numerals indicate like elements, FIG. 1 illustrates an example of a computer system 100 including an exemplary computing device ("computer") 102 configured for pipeline arbitration. In addition to computer 102, exemplary computer system 100 includes network 120 and other device(s) 130. Network 120 connects computer 102 and other device(s) 130 and may include one or more wide area networks (WANs) and/or local area networks (LANs) such as the Internet, intranet(s), and/or wireless communication network(s). Other device(s) 130 may include one or more other devices, e.g., one or more other computers, storage devices, peripheral devices, etc. Computer 102 and other device(s) 130 are in communication via network 120, e.g., to communicate data between them.

Exemplary computer 102 includes processor 104, main memory ("memory") 106, and input/output component(s) 108, which are in communication via bus 103. Processor 104 includes cache memory ("cache") 110 and controls 112, which include components configured for pipeline arbitration that will be described below. Cache 110 may include multiple cache levels (e.g., L1, L2, etc.) that are on or off-chip from processor 104 (e.g., an L1 cache may be on-chip, an L2 cache may be off-chip, etc.). Memory 106 may include various data stored therein, e.g., instructions, software, routines, etc., which, e.g., may be transferred to/from cache 110 by controls 112 for execution by processor 104. Input/output component (s) 108 may include one or more components that facilitate local and/or remote input/output operations to/from computer 102, such as a display, keyboard, modem, network adapter, etc. (not depicted).

Figure 2:
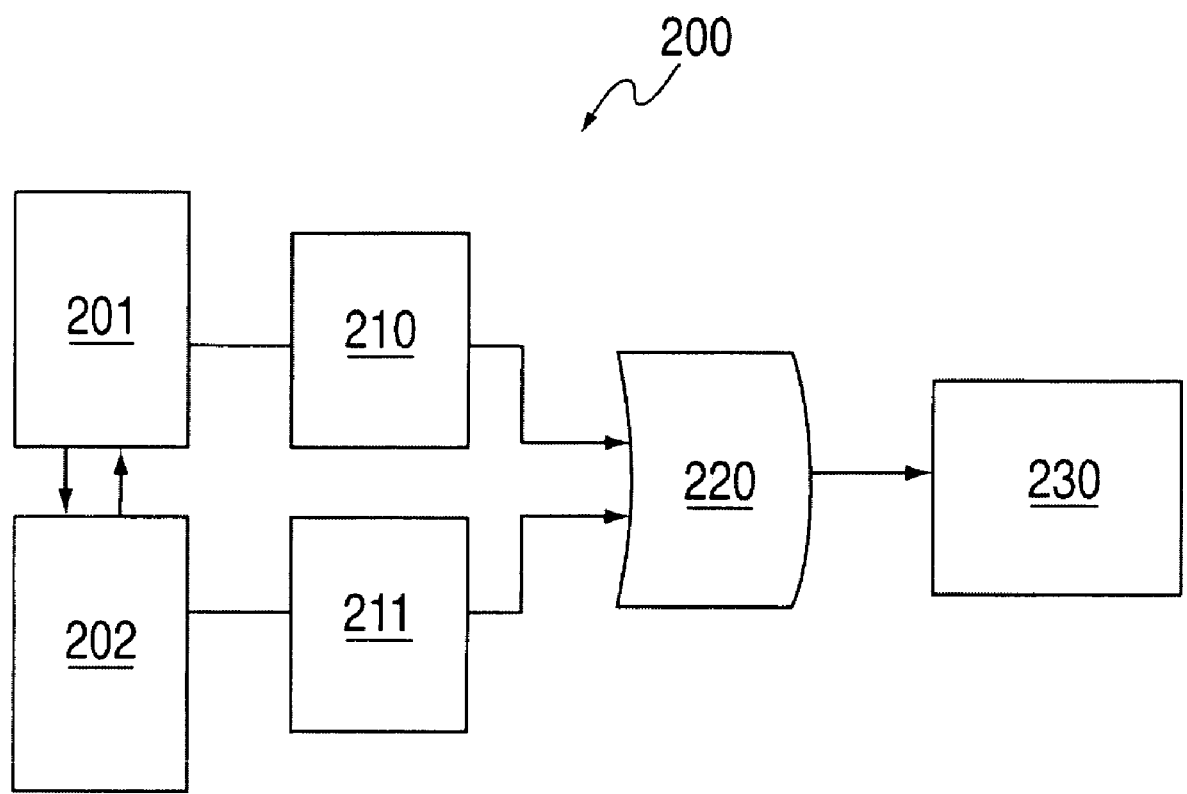
FIG. 2 is a block diagram illustrating an example of a processor subsystem of the exemplary computing device of FIG. 1 that is configured for pipeline arbitration.

FIG. 2 illustrates an example of a processor subsystem 200 of exemplary computer 102 that is configured for pipeline arbitration. Exemplary subsystem 200 may, e.g., be part of controls 112. Subsystem 200 includes pipeline (or "pipe") 201 in "communication" (e.g., via one or more buses, circuits, connections, etc.) with pipeline arbiter 210. Subsystem 200 also includes pipe 202 in communication with pipeline arbiter 211. Pipe 201 and pipe 202 are also in communication via a "cross pipeline" configuration. Pipe arbiter 210 and pipe arbiter 211 are in communication with logic-OR gate circuitry ("OR-gate circuitry") 220, and OR-gate circuitry 220 is in communication with chip interface 230, which, e.g., may be a shared outgoing chip interface.

In an exemplary operation of subsystem 200, pipe 201, 202 sends a request, which may include corresponding interface data, to pipe arbiter 210, 211 (i.e., respectively). Pipe 201 also sends its request to pipe arbiter 211 (e.g., via pipe 202), and pipe 202 also sends its request to pipe arbiter 210 (e.g., via pipe 201). The request and corresponding interface data is arbitrated by pipe arbiter 210, 211 in the pipeline at a point (e.g., sufficiently early enough) to allow arbitration to take place in parallel with the other conditions that affect whether the request and interface data should access the targeted interface 230. Pipe arbiter 210, 211 gates the interface data with the result of the arbitration and outputs the interface data to OR-gate circuitry 220 if its respective pipe wins the arbitration. Thus, OR-gate circuitry 220 outputs the interface data of the pipe that wins the arbitration. As a result, all requests sent, to interface 230 are routed through the main pipe 201, 202 without the need for within-pipe arbitration, e.g., since it is performed by the pipe 201, 202 as described above.

Figure 3:
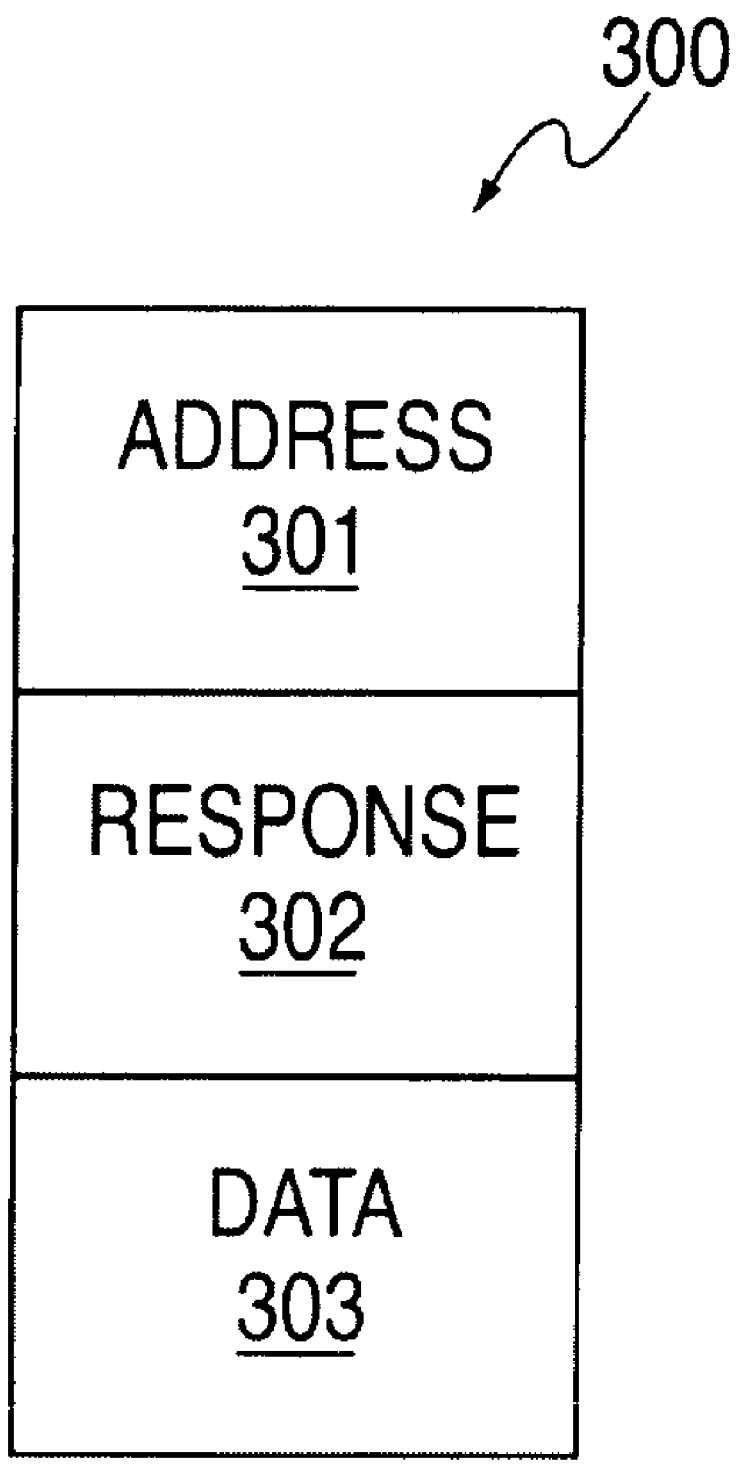
FIG. 3 is a block diagram illustrating an example of interface buses included in the interface of the exemplary processor subsystem of FIG. 2.

FIG. 3 illustrates an example of interface buses 300 included in interface 230 of exemplary processor subsystem 200. Interface buses 300 include address bus 301, response bus 302, and data bus 303, which are separate buses. Requests sent via pipe 201, 202 may access one or more of these buses 301, 302, 303, e.g., dependent on the type of request. For example, exemplary valid requests may access just address bus 301, just response bus 302, both response bus 302 and data bus 303, or all three of address bus 301, response bus 302, and data bus 303. In an exemplary operation, requests to address bus 301 will busy the address portion of interface 230 for one cycle (e.g., of the system clock), requests to response bus 302 will busy the response portion of interface 230 for two cycles, and requests to data bus 303 will busy the data portion of interface 230 for up to sixteen cycles. Arbitration of pipes 201, 202 by pipe arbiters 210, 211 will concurrently (e.g., simultaneously) use as many of interface buses 301, 302, 303 as possible with respect to such operation.

Exemplary valid combinations of usage of interface buses 301, 302, 303 by requests from pipes 201, 202 in regard to the above described exemplary operation include the following. In a first exemplary combination, a request from a first pipe (e.g., 201 or 202) may use address bus 301 while a request from a second pipe (e.g. 202 or 201) may use response bus 302. In this example, during the two cycle busy time for the request to response bus 302 from the second pipe, address bus 301 can be used for another request from the first pipe since there is a one cycle busy time for requests to address bus 301 (e.g., as discussed above). In a second exemplary combination, a request from one pipe (e.g., 201 or 202) may use address bus 301 while a request from the other pipe (e.g. 202 or 201) may use both response bus 302 and data bus 303. In this example, during the two cycle busy time for the request to response bus 302 from the second pipe, address bus 301 can be used for another request from the first pipe as described for the first exemplary combination. Furthermore, during the up to sixteen cycle busy time for the request to data bus 303 from the second pipe, other requests from either the first or the second pipe can use address bus 301 or response bus 302 in accordance with the first exemplary combination. In a third exemplary combination, a request from just one of pipes 201, 202 may use all three of address bus 301, response bus 302, and data bus 303. In this example, during the two cycle busy time for the request to response bus 302 from the one requesting pipe (e.g., 201), address bus 301 can be used for a request from the other pipe (e.g., 202) as described for the first exemplary combination. Furthermore, during the up to sixteen cycle busy time for the request to data bus 303 from the requesting pipe, other requests from either the requesting pipe or the other pipe can use address bus 301 or response bus 302 in accordance with the first exemplary combination.

Figure 4:
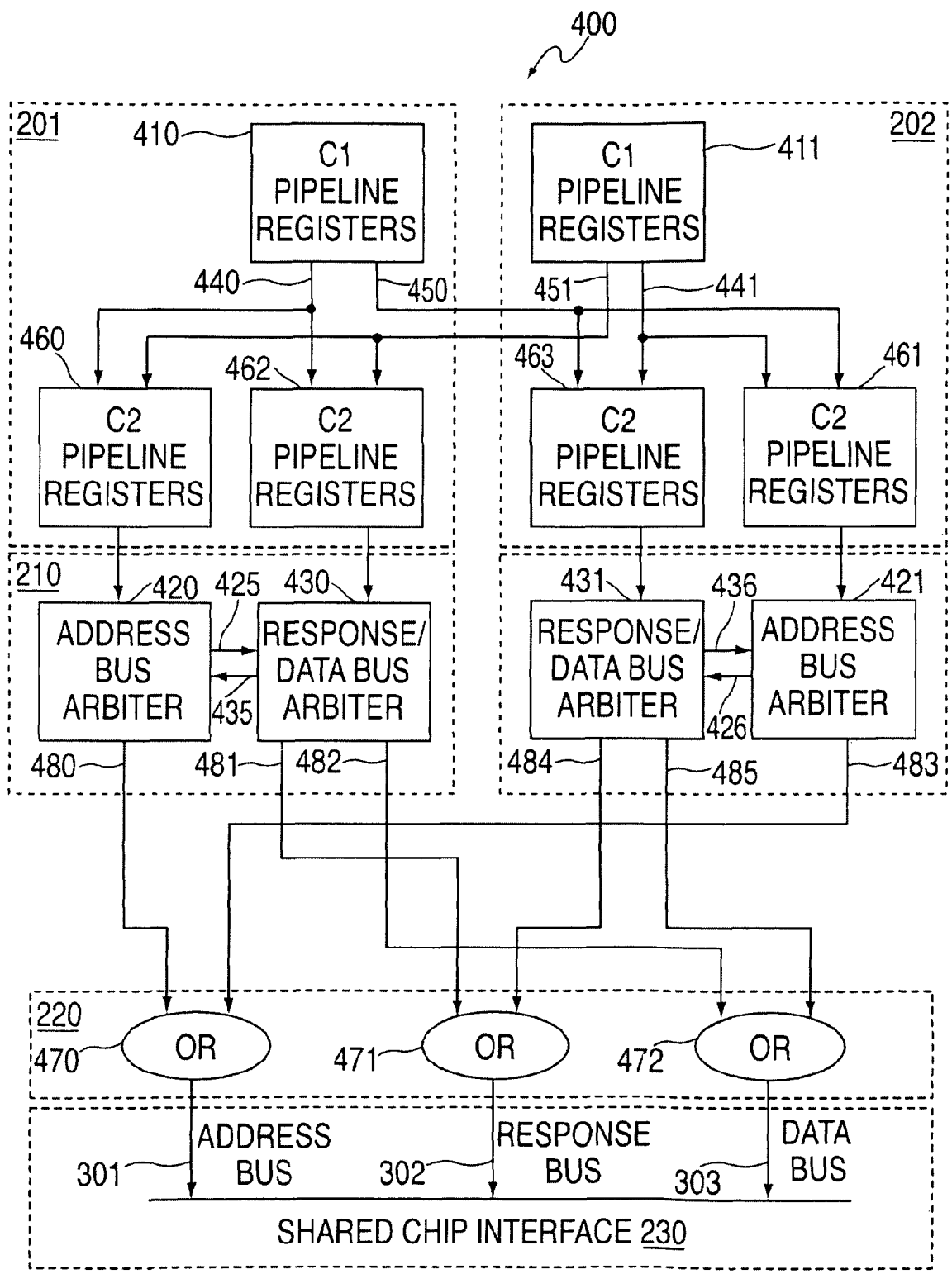
FIG. 4 is a block diagram illustrating an example of the subcomponents of the exemplary processor subsystem of FIG. 2.

FIG. 4 illustrates an example of subcomponents 400 of exemplary processor subsystem 200. Subcomponents 400 are included for pipes 201, 202, pipe arbiters 210, 211, OR-gate circuitry 220, and chip interface 230. Pipes 201 and 202 (or "pipeline logic") respectively include C1-cycle ("C1") pipeline registers 410 and 411 and C2-cycle ("C2") pipeline registers 460, 462 and 461, 463. Pipe arbiters (or "arbitration logic") 210 and 211 respectively include address bus arbiters 420 and 421 and response/data bus arbiters 430 and 431. OR-gate circuitry 220 includes logic-OR gate circuits ("OR-gates") 470, 471, 472. Chip interface 230 includes address bus 301, response bus 302, and data bus 303. Arbitration logic 210, 211 takes into consideration the availability and need of the address bus when making the response/data arbitration decision for competing requests, and it remains consistent with that arbitration decision for the address bus. The cross pipe response/data bus arbitration scheme and the address bus arbitration scheme are both rank priority. A tie-breaker bit is used to determine which pipe's request should be chosen if both pipe's requests are of the same rank.

In an exemplary operation of subcomponents 400, during the C1 cycle, a copy of the information needed for arbitration is sent from C1 pipeline registers 410, 411 to arbitration logic 210, 211 via pipelines 201, 202. C1 pipeline registers 410 send a copy of pipe fields 440 to C2 registers 460, 462 within pipeline 201. C1 pipeline registers 410 also send a copy of pipe fields 450 to C2 registers 461, 463 within pipeline 202. Concurrently, C1 pipeline registers 411 send a copy of pipe fields 441 to C2 registers 461, 463 within pipeline 202. C1 pipeline registers 411 also supply a copy of pipe fields 451 to C2 registers 460, 462 within pipeline 202.

On pipe 201, a separate copy of C2 registers 460 is kept for address bus arbiter 420 and a second set of C2 registers 462 is kept for response/data bus arbiters 430. Similarly, on pipe 202. a separate copy of C2 registers 461 is kept for address bus arbiter 421 and a second set of C2 registers 463 is kept for response/data bus arbiter 431. Response/data bus arbiter 430 uses its set of C2 pipeline registers 462 as inputs and determines whether the request from pipe 201 or pipe 202 will win access to response bus 302 and data bus 303. Response/data bus arbiter 430 receives all the information from C2 pipeline registers 462 to detect both a response/data bus request and an address bus request.

Both the response/data arbitration scheme and the address bus arbitration scheme of arbitration logic 210 are rank priority. If response/data bus arbiter 430 determines that address bus 301 is needed in addition to response bus 302 and data bus 303, response/data bus arbiter 430 checks a sideband "tie-breaker" signal 425 from address bus arbiter 420 that indicates the pipe that address bus arbiter 420 will select if the address bus requests from both pipes 201, 202 are the same rank. Additionally, if the address bus 301 is requested as well as response bus 302 and data bus 303 and response bus 302 or data bus 303 is not available, response/data bus arbiter 430 will indicate this to address arbiter 420 via signal 435 to prevent the address from being sent without the corresponding response and data. This enables address bus arbiter 420 to receive the information from pipeline registers 460 needed to determine the address bus 301 priority. If address bus 301 is requested and available, and pipe 201 wins "cross pipe" arbitration, address bus arbiter 420 outgates the address on bus 480, otherwise, bus 480 is driven to logic-zero ("zero"). If response bus 302 is requested and available, and pipe 201 wins cross pipe arbitration, response/data bus arbiter 430 outgates the response on bus 481, otherwise, bus 481 is driven to zero. If data bus 303 is requested and available, and pipe 201 wins cross pipe arbitration, response/data bus arbiter 430 outgates the data on bus 482, otherwise, bus 482 is driven to zero.

Arbitration logic 211 for pipe 202 is a mirrored copy of arbitration logic 210 for pipe 201. Therefore, both pipes 201, 202 will come to the same determination of the winner of the arbitration. Response/data bus arbiter 431 uses its set of C2 pipeline registers 463 as inputs and determines whether the request of pipe 201 or pipe 202 will win access to response bus 302 and data bus 303. Response/data bus arbiter 431 receives all the information from C2 pipeline registers 463 to detect both a response/data bus request and an address bus request.

Both the response/data arbitration scheme and the address bus arbitration scheme of arbitration logic 210 are rank priority. If response/data bus arbiter 431 determines that address bus 301 is needed in addition to response bus 302 and data bus 303, response/data bus arbiter 431 checks a sideband "tie-breaker" signal 426 from address bus arbiter 421 that indicates the pipe that address bus arbiter 421 will select if the address bus requests from both pipes 201, 202 are the same rank. Additionally, if the address bus 301 is requested as well as response bus 302 and data bus 303 and response bus 302 or data bus 303 is not available, response/data bus arbiter 431 will indicate this to address arbiter 421 via signal 436 to prevent the address from being sent without the corresponding response and data. This enables address bus arbiter 421 to receive the information from pipeline registers 461 needed to determine the address bus 301 priority. If address bus 301 is requested and available, and pipe 202 wins "cross pipe" arbitration, address bus arbiter 421 outgates the address on bus 483, otherwise, bus 483 is driven to logic-zero ("zero"). If response bus 302 is requested and available, and pipe 202 wins cross pipe arbitration, response/data bus arbiter 431 outgates the response on bus 484, otherwise, bus 484 is driven to zero. If data bus 303 is requested and available, and pipe 202 wins cross pipe arbitration, response/data bus arbiter 431 outgates the data on bus 485, otherwise, bus 485 is driven to zero.

Gating address buses 480, 483 from pipe 201, 202 with the arbitration results allows the two buses 480, 483 to be "OR'ed" together (i.e., driven through an OR-gate) before being driven to address bus 302. Similarly, the gating of response buses 481, 484 from pipe 201, 202 with the arbitration results allows the two buses 481, 484 to be OR'ed together before being driven response bus 302. Likewise, the gating of data buses 482, 485 from pipe 201, 202 with the arbitration results allows the two buses 482, 485 to be OR'ed together before being driven to data bus 303.

Figure 5:
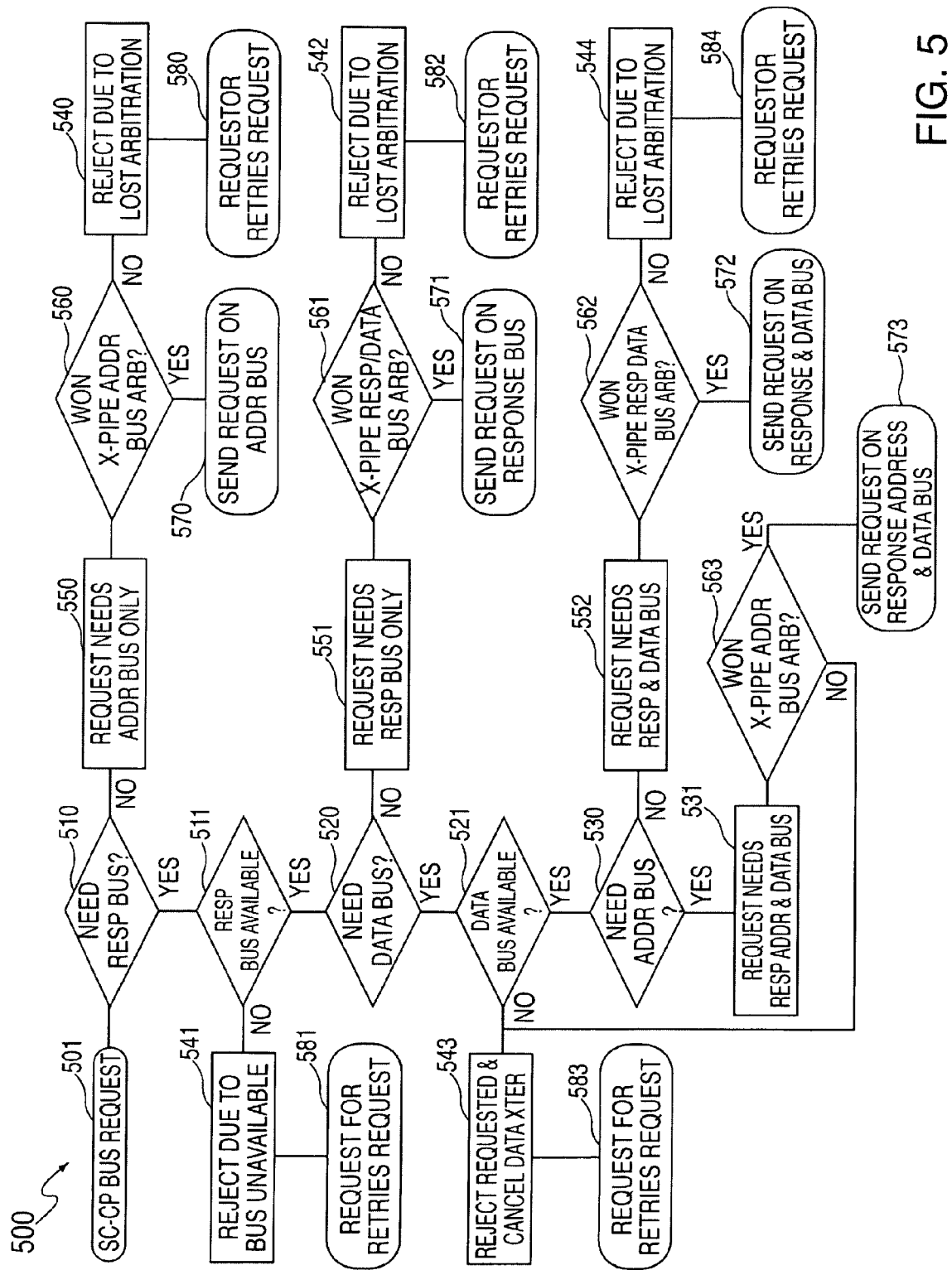
FIG. 5 is a flow diagram illustrating an example of a method for pipeline arbitration executable, for example, on the exemplary computing device of FIG. 1.

FIG. 5 illustrates an example of a method 500 for pipeline arbitration executable, for example, on exemplary computer 102. Exemplary method 500 may, e.g., further describe an exemplary operation of subsystem 200, including subcomponents 400. In block 501, a request is received that needs at least a response bus or an address bus of a shared chip interface. In some embodiments, before a request is arbitrated, requests for the response and data buses are pre-filtered for one or more conditions. This is to prevent blocking a request that has all its buses available by a request from the other pipe that may ultimately be rejected because all its buses were not available, which would result in neither request being multiplexed onto the chip interface. If all these conditions are met, the request is considered for arbitration.

In block 510, it is determined whether the response bus is needed for the received request. If the response bus is not needed, the request is for just the address bus per block 550. In this case, the address bus arbiter is responsible for performing the cross pipe arbitration per block 560. If the local pipe request won priority over the remote pipe's request, or if there was no request from the remote pipe, the local request is sent on the address bus per block 570. If instead, the remote pipe won priority, the local request is rejected by the main pipeline per block 540 and the address bus request is blocked, thus preventing the local pipe from outgating an address onto the interface. The requestor can retry its pipeline request in order to regain access to the interface per block 580.

If the received request did need the response bus, the availability of the response bus is checked per block 511 because the response portion of the bus has a two cycle busy time and may not be available at the time of the request. If the response bus is not available, the operation is rejected by the main pipeline per block 541 and the response request is blocked, thereby preventing the local pipe from outgating a response onto the interface. The requester can retry its pipeline request in order to regain access to the interface per block 581.

If the response bus is available and the request does not need the use of the data bus, as determined per block 520, the request just needs access to the response bus per block 551 and, at this point, meets the criteria to be presented to the cross pipe arbitration itself. If the request wins cross pipe arbitration as determined per block 561 or if there was no response bus request from the remote pipe, the requested response is multiplexed out onto the response portion of the interface per block 571. However, if the response request loses cross pipe arbitration per the determination in block 561, the operation is rejected by the main pipeline per block 542 and the response and data request is blocked, thereby preventing the local pipe from outgating a response and data onto the interface. The requester can retry its pipeline request in order to regain access to the interface per block 582.

If the request does need the use of the data bus, per the determination in block 520, and the data bus is not available, per the determination in block 521, the operation is rejected by the main pipeline per block 543 and the response and data request is blocked, thereby preventing the local pipe from outgating a response and data onto the interface. The requestor can retry its pipeline request in order to regain access to the interface per block 583. If the data bus is available, however, per the determination in block 521, it is then determined whether the request also needs the address bus, per block 530. If the request only needs the response bus and the data bus, per block 552, the request meets the criteria to be presented to the cross pipe arbitration. If the request wins cross pipe arbitration, per the determination in block 562, or if there was no response bus request and no response/data bus request from the remote pipe, the requested response and data is multiplexed out onto the response portion of the interface per block 572. However, if the response request loses cross pipe arbitration, per the determination in block 562, the operation is rejected by the main pipeline, per block 544, and the response and data request is blocked, thereby preventing the local pipe from outgating a response and data onto the interface. The requester can retry its pipeline request in order to regain access to the interface per block 584.

If the address bus is needed in addition to the response bus and the data bus, per the determination in block 531, the request is synchronized with the address bus arbiter. Based on the information captured from the local and remote pipelines, the response/data bus arbitration logic determines if the request in the opposite pipe is also requesting the address bus, and if so, if the opposite pipe's request is of a higher priority than the local request. If both of these conditions are true, then the request for the response, address, and data buses did not win cross pipe arbitration, per the determination in block 563. The operation is rejected by the main pipeline per block 543, and the response and data request is blocked, thereby preventing the local pipe from outgating a response and data onto the interface. The response/data arbiter sends a reject signal to the local pipe's address arbiter, which triggers the address arbiter to block sending the address onto the interface. The requestor can retry its pipeline request in order to regain access to the interface per block 583. However, if the requester won cross pipe arbitration for both the address bus and the response and data buses, per the determination in block 563, or if there was no address bus request and no response bus and data bus request from the remote pipe, the requested response, address, and data are multiplexed out onto the response portion of the interface per block 573.

Elements of exemplary computer system 100, exemplary processor subsystem 200, and exemplary subcomponents 400 are illustrated and described with respect to various components, modules, blocks, etc. for exemplary purposes. It should be understood that other variations, combinations, or integrations of such elements that provide the same features, functions, etc. are included within the scope of embodiments of the invention. Additionally, although the above descriptions are made with respect to two requests arbitrating for the use of one chip interface, exemplary embodiments according to the above descriptions can be applied to arbitrate the use of more than one chip interface. Furthermore, arbitrating the requests by arbitration logic 210, 211 or in exemplary method 500 may be based on one or more other arbitration schemes, policies, etc. in addition to those described herein, which may be known or apparent in the light of the description herein.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to elements of exemplary computer system 100 and exemplary subsystem 200, execution of the flow diagram blocks may be implemented with respect to other systems, subsystems, etc. that provide the same features, functions, etc. in accordance with exemplary embodiments of the invention.

As described above, embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for pipeline arbitration, comprising:
receiving a first request for a shared chip interface from a first pipeline;
determining whether a response bus of the shared chip interface is needed by the first request;
in response to determining that the response bus is not needed by the first request:
concluding that the first request needs just an address bus of the shared chip interface;

arbitrating the first request with a second request for the shared chip interface received from a second pipeline for access to the address bus;

sending the first request to the address bus if the first request wins the arbitration over the second request; and rejecting the first request if the second request wins the arbitration over the first request; and in response to determining that the response bus is needed by the first request:

determining if the response bus is available;

rejecting the first request if the response bus is not available;

determining whether a data bus of the shared chip interface is needed by the first request if the response bus is available; and in response to determining that the data bus is not needed by the first request:

concluding that the first request needs just the response bus;

arbitrating the first request with the second request for access to the response bus;

sending the first request to the response bus if the first request wins the arbitration over the second request; and rejecting the first request if the second request wins the arbitration over the first request.

2. The method of claim 1, further comprising:

in response to determining that the data bus is needed by the first request:

determining if the data bus is available;

rejecting the first request if the data bus is not available;

determining whether an address bus of the shared chip interface is needed by the first request if the data bus is available; and in response to determining that the address bus is not needed by the first request:

concluding that the first request needs the response bus and the data bus;

arbitrating the first request with the second request for access to the response bus and the data bus;

sending the first request to the response bus and the data bus if the first request wins the arbitration over the second request; and rejecting the first request if the second request wins the arbitration over the first request.

3. The method of claim 2, further comprising in response to determining that the address bus is needed by the first request:

concluding that the first request needs the response bus, the data bus, and the address bus;

arbitrating the first request with the second request for access to the response bus, the data bus, and the address bus;

sending the first request to the response bus, the data bus, and the address bus if the first request wins the arbitration over the second request; and rejecting the first request if the second request wins the arbitration over the first request.

4. The method of claim 3, wherein the arbitrating for access to the response bus, the arbitrating for access to the response bus and the data bus, and the arbitrating for access to the response bus, the data bus, and the address bus are based on a rank priority of received requests; and a tie-breaking determination is made if the first request has a same rank as the second request.

5. The method of claim 1, further comprising determining whether a needed bus for the first request and a needed bus for the second request are available before the arbitrating to prevent blocking the first request if the needed bus for the second request is not available or blocking the second request if the needed bus for the first request is not available.

6. A system for pipeline arbitration, comprising:

a first pipeline logic in communication with a first arbitration logic;

a second pipeline logic in communication with a second arbitration logic and also in communication with the first pipeline logic in a cross pipeline configuration;

a logic-OR gate circuitry in communication with the first arbitration logic and the second arbitration logic; and a shared chip interface in communication with the logic-OR gate circuitry and comprising a response bus, a data bus, and an address bus;

wherein the first pipeline logic is configured to send a first request and the second pipeline logic is configured to send a second request, and wherein the first request and the second request each comprise one of:

a request to access just the address bus;

a request to access just the response bus;

a request to access the response bus and the data bus; or a request to access the response bus, the data bus, and the address bus.

7. The system of claim 6, wherein:

the first pipeline logic comprises a first set of pipeline registers in communication with a second set of pipeline registers, a third set of pipeline registers, a fourth set of pipeline registers, and a fifth set of pipeline registers;

the second pipeline logic comprises a sixth set of pipeline registers in communication with the second set of pipeline registers, the third set of pipeline registers, the fourth set of pipeline registers, and the fifth set of pipeline registers;

the first arbitration logic comprises:

a first response/data bus arbiter in communication with the third set of pipeline registers and the logic-OR gate circuitry; and a first address arbiter in communication with the first response/data bus arbiter, the second set of pipeline registers, and the logic-OR gate circuitry;

the second arbitration logic comprises:

a second response/data bus arbiter in communication with the fourth set of pipeline registers and the logic-OR gate circuitry; and a second address arbiter in communication with the first response/data bus arbiter, the fifth set of pipeline registers and the logic-OR gate circuitry; and the logic-OR gate circuitry comprises:

a first logic-OR gate circuit in communication with the first address bus arbiter, the second address bus arbiter and the address bus;

a second logic-OR gate circuit in communication with the first response/data bus arbiter, the second response/data bus arbiter, and the response bus; and a third logic-OR gate circuit in communication with the first response/data bus arbiter, the second response/data bus arbiter, and the data bus.

8. The system of claim 6, wherein the shared chip interface is configured to:

allow one of the first request or the second request to access the address bus while allowing an other of the first request or the second request to access the response bus;

allow the one of the first request or the second request to access the address bus while allowing the other of the first request or the second request to access the response bus and the data bus; and allow either just the first request or just the second request to access the address bus, the response bus, and the data bus;

wherein an access of the address bus causes it to be busy for one system clock cycle, an access of the response bus causes it to be busy for two system clock cycles, and an access of the data bus causes it to be busy for up to sixteen clock cycle, and wherein the shared chip interface is configured to allow the access of at least one of the address bus, the response bus, and the data bus while an other of the address bus, the response bus, or the data bus is busy.

9. The system of claim 6, wherein:

the first pipeline logic is configured to send a first request for the shared chip interface to the first arbitration logic and the second arbitration logic;

the second pipeline logic is configured to send a second request for the shared chip interface to the second arbitration logic and the first arbitration logic; and the first arbitration logic and the second arbitration logic are configured to determine whether the response bus is needed by the first request or the second request and, if it is determined that the response bus is not needed by the first request and not needed by the second request, to:

conclude that the first request and the second request each need just the address bus;

arbitrate the first request with the second request for access to the address bus;

send the first request to the address bus and reject the second request, via the logic-OR gate circuitry, if the first request wins the arbitration; and send the second request to the address bus and reject the first request, via the logic-OR gate circuitry, if the second request wins the arbitration.

10. The system of claim 9, wherein the first arbitration logic and the second arbitration logic are further configured to, if it is determined that the response bus is needed by the first request and needed by the second request:

determine if the response bus is available;

reject the first request and the second request if the response bus is not available;

determine whether the data bus is needed by the first request or the second request if the response bus is available; and if it is determined that the data bus is not needed by the first request and not needed by the second request:

conclude that the first request and the second request each need just the response bus;

arbitrate the first request with the second request for access to the response bus;

send the first request to the response bus and reject the second request, via the logic-OR gate circuitry, if the first request wins the arbitration; and send the second request to the response bus and reject the first request, via the logic-OR gate circuitry, if the second request wins the arbitration.

11. The system of claim 10, wherein the first arbitration logic and the second arbitration logic are further configured to, if it is determined that the data bus is needed by the first request and needed by the second request:

determine if the data bus is available;

reject the first request and the second request if the data bus is not available;

determine whether the address bus is needed by the first request or the second request if the data bus is available; and if it is determined that the address bus is not needed by the first request and not needed by the second request:

conclude that the first request and the second request each need the response bus and the data bus;

arbitrate the first request with the second request for access to the response bus and the data bus;

send the first request to the response bus and the data bus and reject the second request, via the logic-OR gate circuitry, if the first request wins the arbitration; and send the second request to the response bus and the data bus and reject the first request, via the logic-OR gate circuitry, if the second request wins the arbitration.

12. The system of claim 11, wherein the first arbitration logic and the second arbitration logic are further configured to, if it is determined that the address bus is needed by the first request and needed by the second request:

conclude that the first request and the second request each need the response bus, the data bus, and the address bus;

arbitrate the first request with the second request for access to the response bus, the data bus, and the address bus;

send the first request to the response bus, the data bus, and the address bus and reject the second request, via the logic-OR gate circuitry, if the first request wins the arbitration; and send the second request to the response bus, the data bus, and the address bus and reject the first request, via the logic-OR gate circuitry, if the second request wins the arbitration.

13. The system of claim 12, wherein the first arbitration logic and the second arbitration logic are further configured to:

arbitrate based on a rank priority of received requests; and make a tie-breaking determination if the first request has a same rank as the second request.

14. A computer program product for pipeline arbitration, comprising a computer usable medium having a computer readable program, wherein the computer readable program, when executed on a computer, causes the computer to:

receive a first request for a shared chip interface from a first pipeline;

determine whether a response bus of the shared chip interface is needed by the first request;

in response to determining that the response bus is not needed by the first request:

conclude that the first request needs just an address bus of the shared chip interface;

arbitrate the first request with a second request for the shared chip interface received from a second pipeline for access to the address bus;

send the first request to the address bus if the first request wins the arbitration over the second request; and reject the first request if the second request wins the arbitration over the first request; and in response to determining that the response bus is needed by the first request:

determine if the response bus is available;

reject the first request if the response bus is not available;

determine whether a data bus of the shared chip interface is needed by the first request if the response bus is available; and in response to determining that the that the data bus is not needed by the first request:

conclude that the first request needs just the response bus;

arbitrate the first request with the second request for access to the response bus;
send the first request to the response bus if the first request wins the arbitration over the second request; and
reject the first request if the second request wins the arbitration over the first request.

15. The computer program product of claim 14, wherein the computer readable program, when executed on the computer, further causes the computer to:
in response to determining that the data bus is needed by the first request:
determine if the data bus is available;
reject the first request if the data bus is not available;
determine whether an address bus of the shared chip interface is needed by the first request if the data bus is available; and
in response to determining that the address bus is not needed by the first request:
conclude that the first request needs the response bus and the data bus;
arbitrate the first request with the second request for access to the response bus and the data bus;
send the first request to the response bus and the data bus if the first request wins the arbitration over the second request; and
reject the first request if the second request wins the arbitration over the first request.

16. The computer program product of claim 15, wherein the computer readable program, when executed on the computer, further causes the computer to:
in response to determining that the address bus is needed by the first request:
conclude that the first request needs the response bus, the data bus, and the address bus;
arbitrate the first request with the second request for access to the response bus, the data bus, and the address bus;
send the first request to the response bus, the data bus, and the address bus if the first request wins the arbitration over the second request; and
reject the first request if the second request wins the arbitration over the first request.

17. The computer program product of claim 16, wherein the computer readable program, when executed on the computer, causes the computer to:
arbitrate for access to the response bus, arbitrate for access to the response bus and the data bus, and arbitrate for access to the response bus, the data bus, and the address bus based on a rank priority of received requests; and
make a tie-breaking determination if the first request has a same rank as the second request.

18. The computer program product of claim 14, wherein the computer readable program, when executed on the computer, causes the computer to determine whether a needed bus for the first request and a needed bus for the second request are available before the arbitrating to prevent blocking the first request if the needed bus for the second request is not available or blocking the second request if the needed bus for the first request is not available.

* * * * *